United States Patent
Kurosawa

(10) Patent No.: US 6,879,415 B2
(45) Date of Patent: Apr. 12, 2005

(54) FILM SCANNER

(75) Inventor: Yuichi Kurosawa, Tokyo (JP)

(73) Assignee: PENTAX Corporation, Tokyo (JP)

( * ) Notice: Subject to any disclaimer, the term of this patent is extended or adjusted under 35 U.S.C. 154(b) by 733 days.

(21) Appl. No.: 09/773,584

(22) Filed: Feb. 2, 2001

(65) Prior Publication Data
US 2001/0012135 A1 Aug. 9, 2001

(30) Foreign Application Priority Data
Feb. 3, 2000 (JP) ..................................... P2000-026341

(51) Int. Cl.$^7$ ................................................ H04M 1/04
(52) U.S. Cl. ..................... 358/474; 358/496; 358/497; 358/471; 358/487; 396/512; 355/75
(58) Field of Search ................................ 358/474, 471, 358/487, 497, 496; 396/512, 511; 355/75

(56) References Cited

U.S. PATENT DOCUMENTS

| | | | |
|---|---|---|---|
| 5,565,912 A | * 10/1996 | Easterly et al. | 348/96 |
| 5,933,222 A | * 8/1999 | Hoshino et al. | 355/75 |
| 6,088,084 A | * 7/2000 | Nishio | 355/75 |
| 6,118,116 A | * 9/2000 | Sawada et al. | 250/208.1 |
| 6,271,912 B1 | * 8/2001 | Kurosawa et al. | 355/75 |
| 6,533,059 B2 | * 3/2003 | Lecuit | 180/311 |
| 6,542,262 B1 | * 4/2003 | Tachibana et al. | 358/487 |

* cited by examiner

Primary Examiner—Kimberly Williams
Assistant Examiner—Negussie Worku
(74) Attorney, Agent, or Firm—Greenblum & Bernstein, P.L.C.

(57) ABSTRACT

A film scanner performs a main-scan of a film by an imaging device and performs a sub-scan of the imaging device so as to enable scanning at any resolution using a simple configuration. The scanning mechanism, for the sub-scan of the film with respect to the imaging device, has a transport table for supporting the film held by a film holder and transporting it in a sub-scan direction and a transport mechanism for moving the transport table in the sub-scan direction. The source of the drive power of the transport mechanism is a scan motor (stepper motor) driven by a pulse signal output from a motor drive circuit. The motor drive circuit is configured to enable micro-stepping of the scan motor.

14 Claims, 8 Drawing Sheets

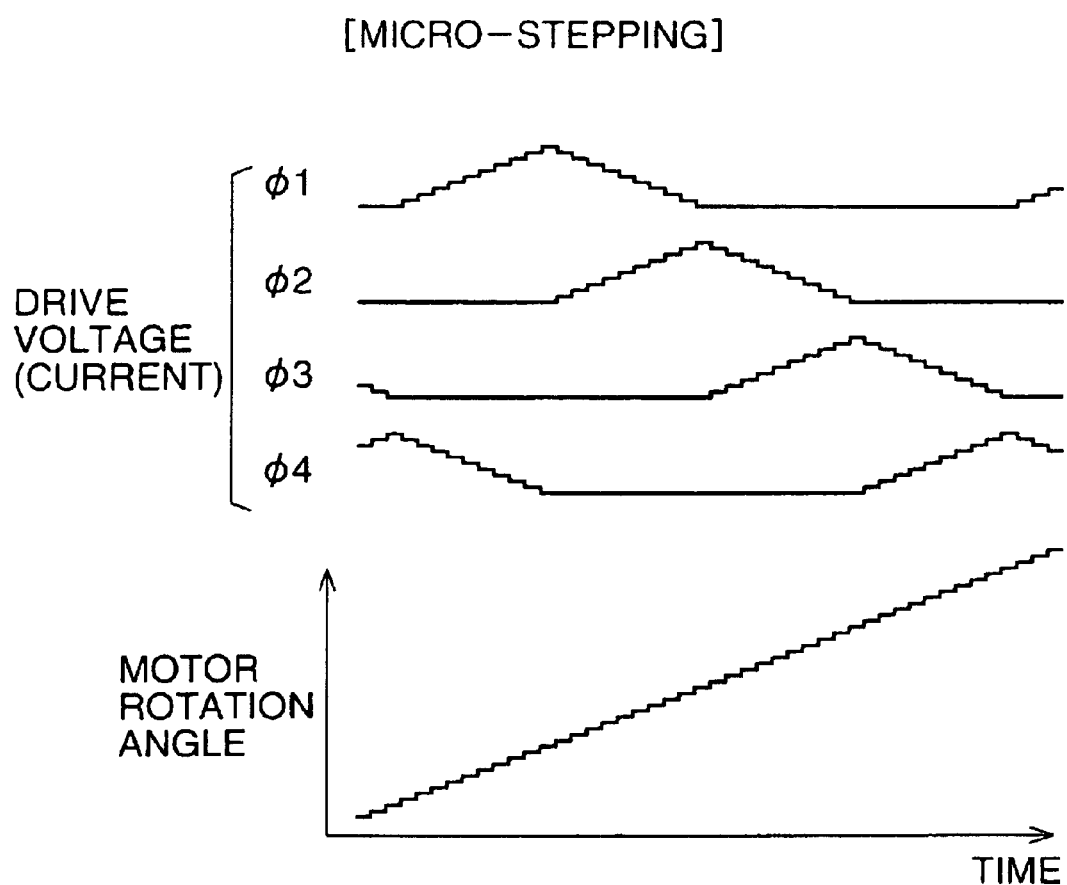

FILM SCANNER

BACKGROUND OF THE INVENTION

1. Field of the Invention

The present invention relates to a film scanner for scanning an image formed on a silver halide film by a photoelectric conversion element to convert it to an image signal.

2. Description of the Related Art

Recently, along with the development of personal computers (PC), it is known that an image taken by a digital still camera and an image scanned by a scanner are input into a PC for image processing or storage. Similarly, an image, recorded on a photographic film such as silver halide film, can be scanned by the scanner and input into the PC. In the scanner, a line sensor comprised of an array of photoelectric conversion elements is moved in a sub-scan direction perpendicular to the longitudinal direction of the line sensor.

In this type of film scanner, it is desired to scan the film image at different resolutions. For example, when dense image data is desired, the image is scanned at a high resolution, while when the PC has a small storage capacity, the image is scanned at a low resolution. Alternatively, there are scanners provided with pre-scan functions of scanning a film image at a low resolution for confirmation before the main-scan of the film image at the regular resolution. In such a case, normally, the pitch by which the film is transported for scanning the film image at different positions is changed. For the high resolution main-scan, the pitch of the film transport is made fine, while for the low resolution pre-scan, the pitch of film transport is made coarse. Therefore, conventionally, provision has been made for a stepper motor serving as the source of drive power for the transport mechanism which moves the transport table and a variable speed reduction mechanism to switch the rotational output of the stepper motor. A predetermined pulse is supplied per unit time to the stepper motor to drive the rotation of the stepper motor in predetermined steps. In the main-scan and the pre-scan, the speed ratio of the speed changer is switched to change the pitch of movement of the transport table.

In a film transport mechanism of such a configuration, however, a gear mechanism comprised of a plurality of gears is required for constructing the variable speed reduction mechanism used as the speed changer. Further, a mechanism is necessary for switching the states of engagement of the plurality of gears to change the speed ratio. Thus, the film transport mechanism becomes complicated. This becomes an obstacle in reducing the size and cost of the film scanner. Further, it may be considered to set the scanning pitch of the film transport mechanism at the minimum pitch and switch the number of pulses for driving the stepper motor so as to change the pitch of movement of the transport table between the main-scan and the pre-scan, but the number of pulses supplied to the stepper motor itself would be the same between the pre-scan and the main-scan, so the pre-scan would then take the same degree of time as the main-scan despite the coarse scan.

SUMMARY OF THE INVENTION

Therefore, an object of the present invention is to provide a film scanner which achieves simplification of the structure and enables scanning at any resolution.

According to the present invention, there is provided a film scanner comprising an imaging device, a transport table, a stepper motor and a motor drive circuit. The imaging device senses a part of the image. The transport table supports the film. The stepper motor moves at least one of the imaging device and the transport table in a predetermined direction, so that the imaging device can sense the whole of the image. The motor drive circuit pulse-drives the stepper motor in steps. The motor drive circuit enables micro-stepping control of the stepper motor.

Further, according to the present invention, there is provided a film scanner provided with an imaging device for performing a main-scan of a film on which an image is formed to scan the image and a scanning mechanism for moving the film in a sub-scan direction perpendicular to the main-scan direction with respect to the imaging device, characterized in that the scanning mechanism is provided with a transport table for supporting the film and transporting it in the sub-scan direction and a transport mechanism for making the transport table move in the sub-scan direction. The transport mechanism is provided with a stepper motor as a source of drive power, a motor drive circuit for pulse driving the stepper motor in steps, and the motor drive circuit is configured to enable micro-stepping control of the stepper motor.

BRIEF DESCRIPTION OF THE DRAWINGS

The objects and advantages of the present invention will be better understood from the following description, with reference to the accompanying drawings in which:

FIG. 6 is a view of the timing of the pulse signals and the motor rotational angle for explaining microstep operation;

DESCRIPTION OF THE PREFERRED EMBODIMENTS

Figure 1:
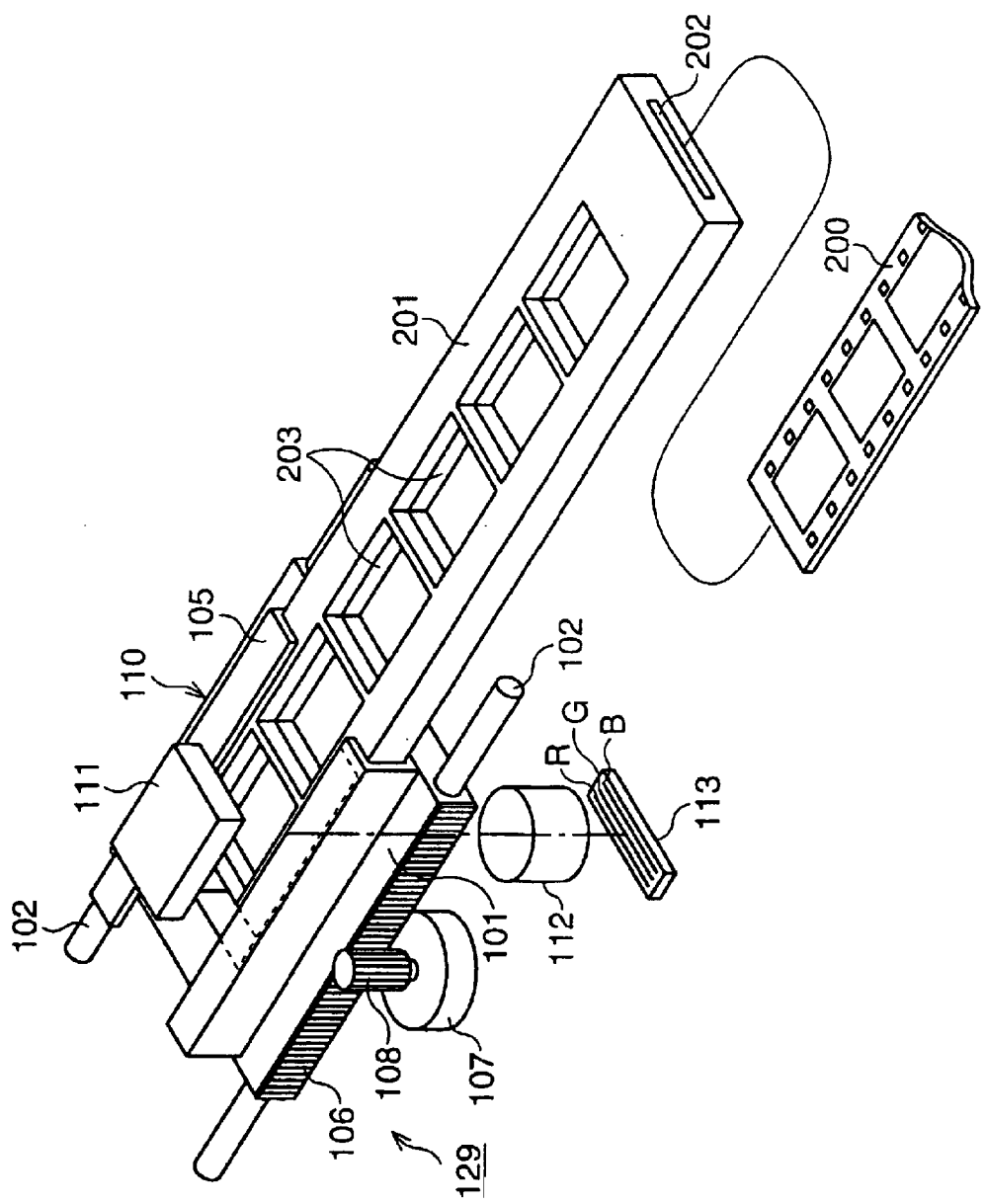
FIG. 1 is a perspective view of the overall configuration of an embodiment of a film scanner of the present invention.

The present invention will be described below with reference to an embodiment shown in the drawings.

Figure 2:
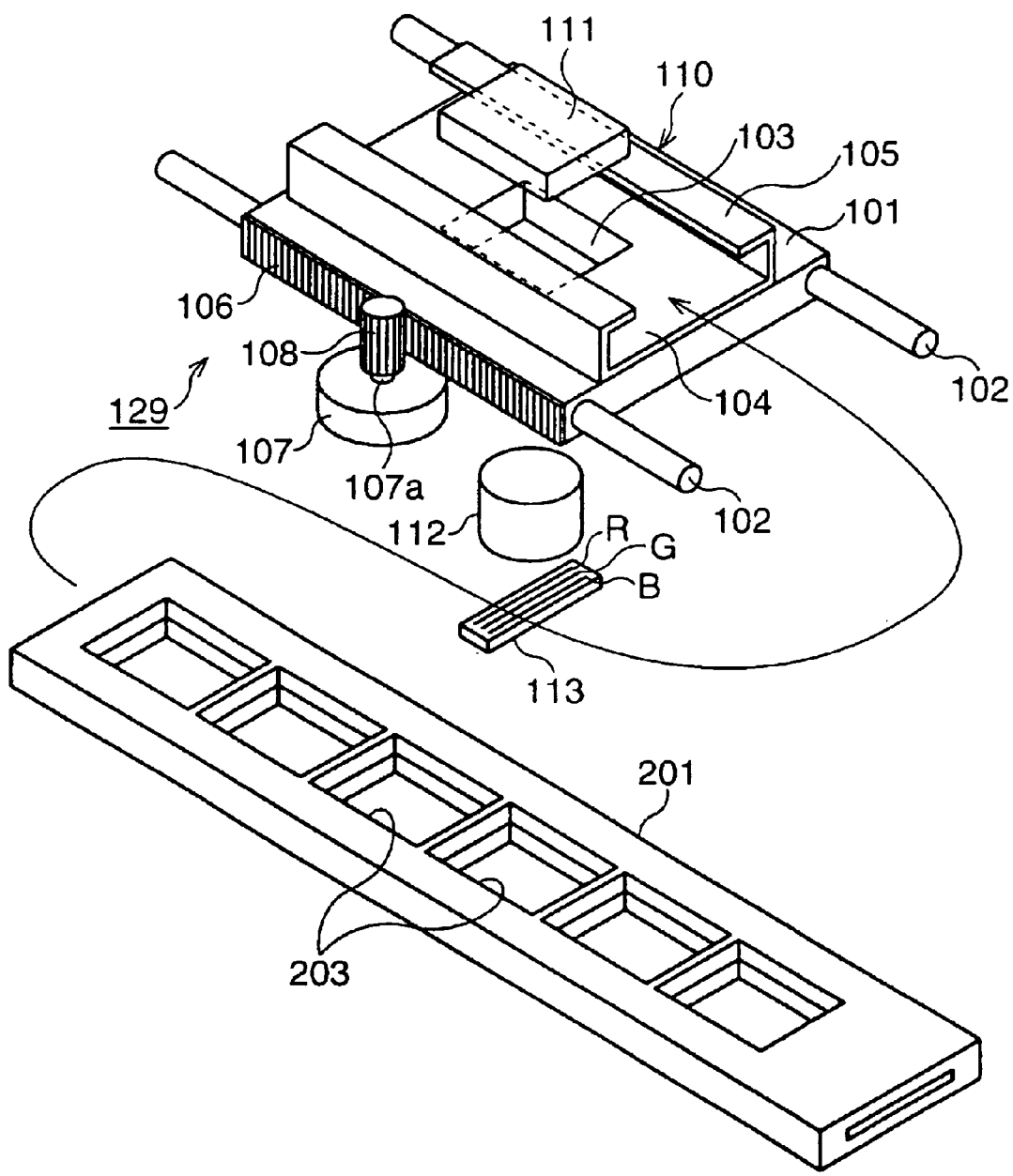
FIG. 2 is a partial disassembled perspective view of FIG. 1.

FIG. 1 is a perspective view of the general configuration of a film scanner of the embodiment of the present invention, while FIG. 2 is a partial disassembled perspective view of the same. Two guide bars 102 are provided in a not shown housing in the horizontal direction. A transport table 101 is carried by the guide bars 102. A film holder 201 for holding a film to be scanned is held on the transport table 101. A scan unit 110 is formed at part of the region in the longitudinal direction between the two guide bars 102. The scan unit 110 is comprised of a diffused illumination source 111 arranged at a position above the guide bars 102 and with a light emitting surface facing down, an imaging lens 112 arranged directly under the diffused illumination source 111 at a position below the guide bars 102, and a line sensor 113 comprised of an array of CCDs for photoelectric conversion of the image formed by the imaging lens 112. The line sensor 113 is comprised of three parallel line sensors corresponding to the RGB colors. The line direction of the line sensor 113 is perpendicular to the longitudinal direction of the guide bars 102. By scanning in the line direction, the main-scan of the film is performed simultaneously for the RGB colors.

The guide bars 102 pass through two sides of the transport table 101 so that the transport table 101 can slidably and reciprocally move along the guide bars 102. A rectangular scanning window 103 is formed in the direction of thickness at the substantial center position of the transport table 101. The film is scanned by the line sensor 113 through this scanning window 103. On the top surface of the transport table 101, a film holder rail member 104 is affixed in the longitudinal direction, with two sides bent into L-shaped rails 105 along the two longitudinal sides of the scanning window 103. The film holder 201 is held between the rails 105. The film holder 201 is able to move along the direction of extension of the rails 105. A rack 106 is provided integrally along the longitudinal direction at one side face of the transport table 101. A pinion 108 attached to a shaft 107a of a stepper motor 107 fixed to the housing near one guide bar 102 is engaged with the rack 106. The scan motor 107 is a stepper motor driven by a pulse signal as will be explained later.

The film 200 held by the film holder 201 is comprised of a film strip obtained by dividing a 35 mm film into lengths of, for example, six frames. The film holder 201 holding this film 200 is formed into a strip shape of dimensions somewhat larger than the film 200. At the substantial center in the thickness direction, a slot 202 for inserting the film 200 is formed over the entire length in the longitudinal direction. Six frame windows 203 are arranged in the longitudinal direction of the film holder 201 corresponding to the slot 202 and open in the thickness direction of the frame holder 201. The frame windows 203 are formed to sizes and pitches corresponding to the frames of the images formed on the film 200.

Figure 3:
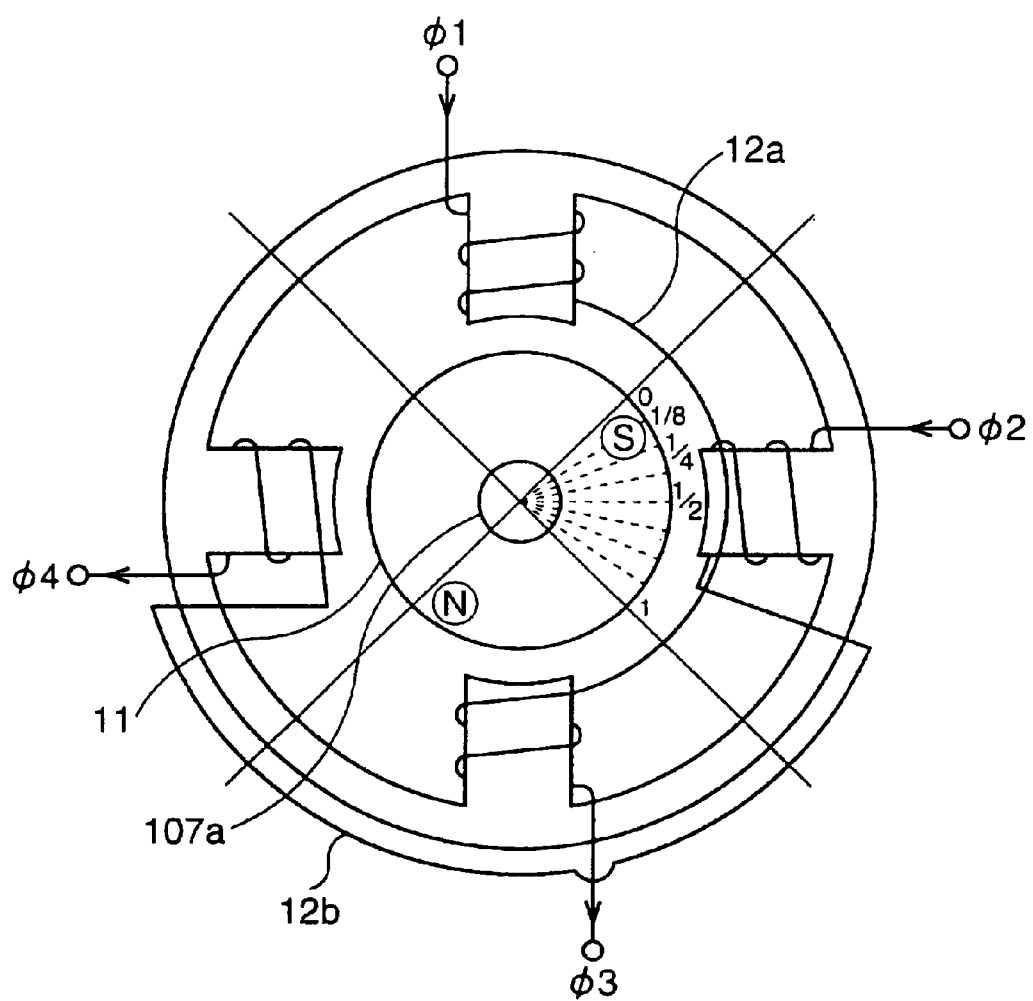
FIG. 3 is a schematic view for explaining the configuration and operation of a scan motor (stepper motor)

FIG. 3 is a view of the general configuration of the scan motor 107. Here, for simplification, the basic step angle is made 90 degrees. The motor 107 is provided with a rotor 11 with N and S poles arranged alternately in the circumferential direction and formed integrally with the shaft 107a and phase coils 12a and 12b serving as stators arranged in the circumferential direction around the rotor 11 and fixed to a not shown motor case. Note that here, to facilitate understanding, the rotor 11 is provided with a pair of an S pole and N pole facing each other in the diametrical direction. The phase coils 12a and 12b serve as the stators, and the first phase coil 12a is arranged at angular positions of 180 degrees in the circumferential direction and the second phase coil 12b is arranged at angular positions of 90 degrees in the circumferential direction with respect to the first phase coil 12a. The first phase coil 12a has one end designated as a first phase terminal $\phi1$ and the other end as the third phase terminal $\phi3$, while the second phase coil 12b has one end designated as the second phase terminal $\phi2$ and the other end as the fourth phase terminal $\phi4$.

Figure 4:
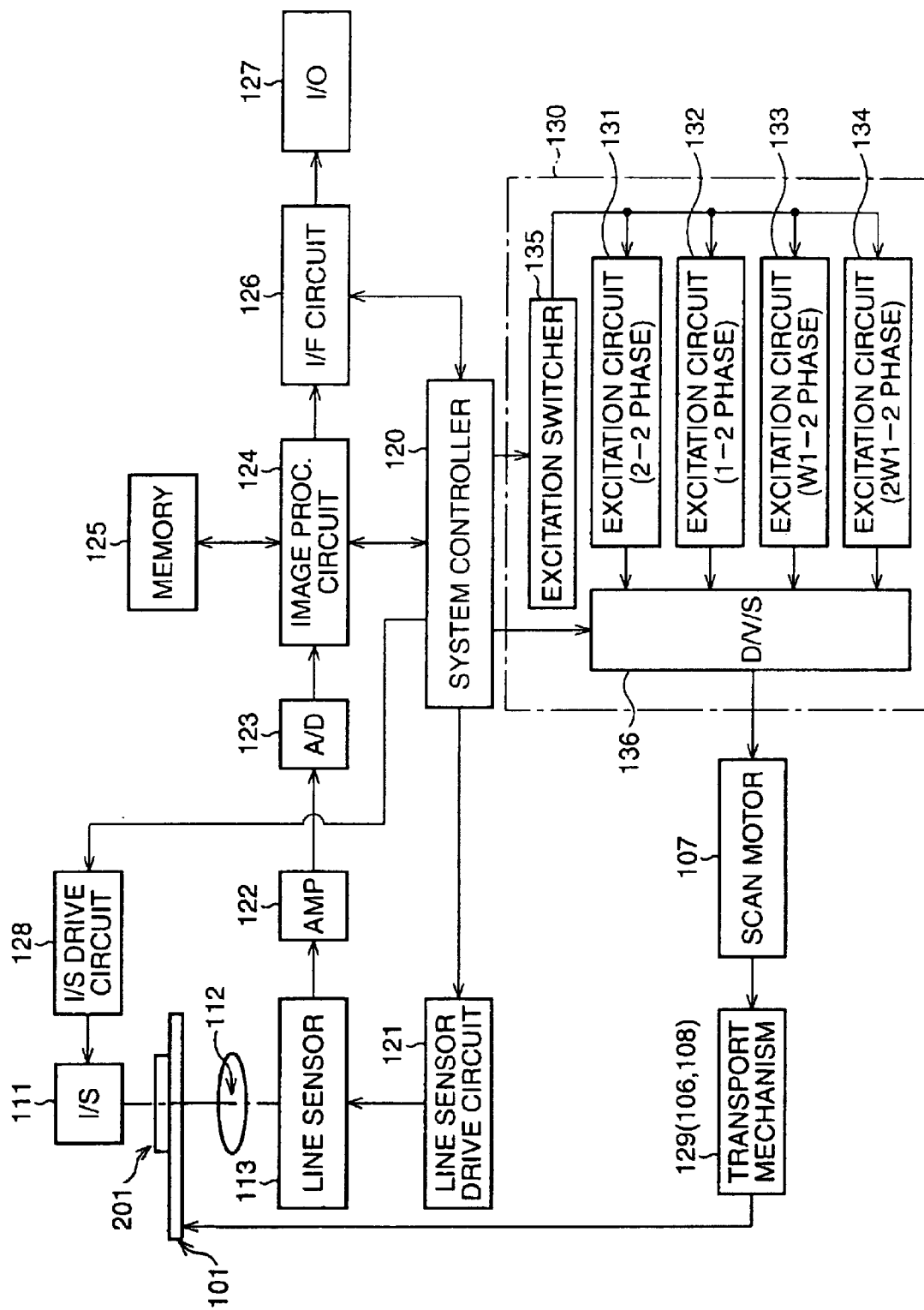
FIG. 4 is a block diagram of the electrical circuit of the film scanner.

FIG. 4 shows the configuration of the electrical circuit of the film scanner. Note that the portions shown in FIG. 1 and FIG. 2 are given the same reference numerals. The line sensor 113 is driven by a line sensor drive circuit 121 controlled by a system controller 120. The scan signal of the film output from the line sensor 113 is amplified by an amplifier 122, converted to a digital signal at an A/D converter 123, and subjected to a predetermined image processing at an image processing circuit 124, to produce the processed image signal. A memory 125 stores the processed image signal. The image signal is output through an interface circuit 126 to an input/output terminal 127 and sent to a not shown PC etc. Light emission from the diffused illumination source 111 is controlled by an illumination source drive circuit 128, which in turn is controlled by the system controller 120. Rotation of the scan motor 107 is controlled by a motor drive circuit 130, which in turn is controlled by the system controller 120, and is configured to drive a transport mechanism 129 comprised of the rack 106 and pinion 108.

The motor drive circuit 130 is provided with four types of phase excitation circuits, that is, a 2—2 phase excitation circuit 131, a 1-2 phase excitation circuit 132, a W1-2 phase excitation circuit 133, and a 2W1-2 phase excitation circuit 134. These excitation circuits 131 to 134 are selected by an excitation switcher 135 which receives commands from the system controller 120. A drive voltage supplier 136 is provided for supplying drive voltages to the phase terminals $\phi1$ to $\phi4$ of the first and second phase coils 12a and 12b of the scan motor 107 by the system controller 120 corresponding to the selected phase excitation circuit. The phase excitation circuits 131 to 134 are preset in drive voltages and phases supplied to the phase terminals $\phi1$ to $\phi4$, to rotationally drive the scan motor 107 in predetermined steps. The drive voltage supplier 136 is configured to supply set drive voltages to the scan motor 107 as pulse signals of a set phase based on the drive voltage and phase set in the selected phase excitation circuit.

Figure 5A:
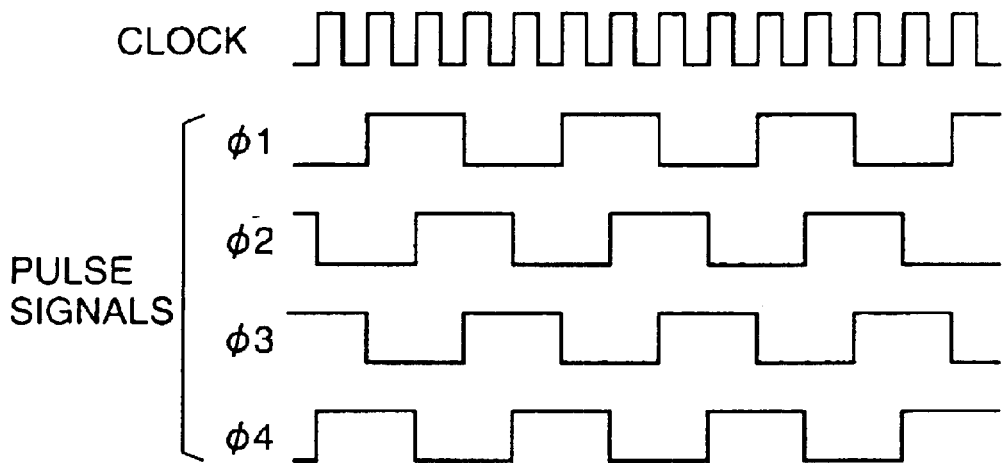
FIGS. 5a and 5b are timing charts of the pulse signals of a 1-2 phase excitation mode and 2—2 phase excitation mode input to the scan motor (stepper motor)
Figure 5B:
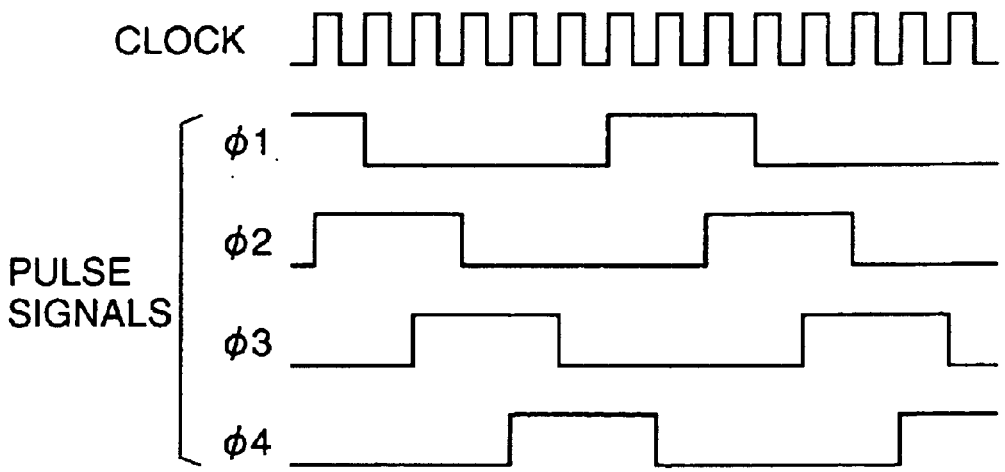

The operation for driving the scan motor 107 by the motor drive circuit 130 will be explained. Referring to FIG. 3, in the scan motor, the rotational angle position of the rotor 11 is set by a step corresponding to the magnetic force produced between the field caused by the phase coils 12a and 12b and the field caused by the N pole and S pole of the rotor 11 due to the control of the phases of the pulse signals supplied to the first phase terminal $\phi1$ to the fourth phase terminal $\phi4$. Namely, when the excitation switcher 135 of the motor drive circuit 130 selects the 2—2 phase excitation circuit 131 and the drive voltage and phase stored in the 2—2 phase excitation circuit 131 are input to the drive voltage supplier 136, the drive voltage supplier 136 supplies pulse signals to the first phase terminal $\phi1$ to the fourth phase terminal $\phi4$, based on the set drive voltage and phase, as shown in FIG. 5a. Due to this, the scan motor 107 enters the 2—2 phase excitation mode and the rotor 11 is driven by the basic rotational angle, that is, the full-step (in this example, a rotational angle of 90 degrees), determined by the pitch between the S pole and N pole of the rotor 11 in the circumferential direction, in other words, the pitch of arrangement of the phase coils 12 in the circumferential direction. Conversely, when the excitation switcher 135 of the motor drive circuit 130 selects the 1-2 phase excitation circuit 132 and the drive voltage and phase stored in the 1-2 phase excitation circuit 132 are input to the drive voltage supplier 136, the drive voltage supplier 136 supplies pulse signals to the first phase terminal $\phi1$ to the fourth phase terminal $\phi4$ by the set drive voltage and phase so as to set the 1-2 phase excitation mode, as shown in FIG. 5b. The rotor 11 is rotated in half steps (in this example, a rotational angle of 45 degrees) equal to half of the rotational angle of the full-step.

When the excitation switcher 135 of the motor drive circuit 130 selects the W1-2 phase excitation circuit 133 or the 2W1-2 phase excitation circuit 134, the scan motor 107 can be driven by microsteps of steps smaller than the half step. This micro-stepping control for example, referring to FIG. 3, supplies pulse signals of different currents to the first phase terminal φ1 and the second phase terminal φ2. Therefore, a difference arises between the field strength of the first phase coil 12a arising from the first phase terminal φ1 and the field strength of the second phase coil 12b arising from the second phase terminal φ2. Thus, the rotor 11 is stopped at the angular position where the field strengths of the first phase coil and the second phase coil become equal. Therefore, by suitably setting the phases of the pulse signals supplied to the phase coils 12a and 12b and the ratio of the drive voltages of the two coils, it becomes possible to rotate the scan motor 107 by steps smaller than the half step of the 1-2 phase excitation circuit 132.

In this embodiment, in the W1-2 phase excitation circuit 133 as shown in FIG. 3, the phases and the drive voltages of the pulse signals supplied to the phase coils 12a and 12b are set for driving in quarter steps (rotational angle of 22.5 degrees) equal to half of the half step. In the 2W1-2 phase excitation circuit 134, the phase and the drive voltage of the pulse signal supplied to the phase coils 12a and 12b are set for driving in eighth steps (rotational angle of 11.25 degrees) equal to half again of the quarter step of the W1-2 phase excitation circuit 133. Therefore, by the excitation switcher 135 selecting the W1-2 phase excitation circuit 133 or the 2W1-2 phase excitation circuit 134, the drive voltage supplier 136 supplies a drive voltage to the scan motor 107, based on the set phase, and drive voltage and the scan motor 107 can be driven in quarter steps or eighth steps of the basic full-step.

FIG. 6 shows the characteristics of the currents supplied to the phase coils 12a and 12b at the time of micro-stepping in the scan motor of FIG. 3 and the relationship of the motor rotation angles at that time. As shown in the drawing, by controlling the system so that different voltages (currents) are supplied to the phase terminals φ1 to φ4 of the phase coils 12a and 12b at the predetermined timings, it becomes possible to control the rotational angle of the motor in extremely fine steps.

With reference to the flow chart of FIG. 7, scanning using the film scanner of the above configuration will be explained. First, the scan motor 107 is driven in a state with the film holder 201 not set on the transport table 101 so as to set the transport table 101 to an initial position. At this time, the excitation switcher 135 of the motor drive circuit 130 selects the 2—2 phase excitation circuit 131 and drives the scan motor 107 by full-steps, whereby the transport table 101 is set to the initial position at a high speed (steps S101, S102, and S103). Further, in the initial position, it is confirmed that the film holder 201 is not set (step S104). If a film holder 201 is set, a holder removal warning is issued to warn the operator to remove the film holder (step S105). After it is confirmed that the holder is not set, the diffused illumination source is turned on (step S106) and light from the diffused illumination source is received by the line sensor 113 through the scanning window of the transport table 201. Shading is corrected at the image processing circuit 124 based on the received light (step S107).

Suitably thereafter, the operator inserts the film 200 to be scanned into the slot 202 of the film holder 201, and positions images of the film at the frame windows 203 of the film holder 201. Then, the operator inserts the film holder 201 between the rails 105 of the transport table 101 and positions an image to be scanned at the scanning window 103 of the transport table 101. After confirming that the film holder 201 is set (step S108), the diffused illumination source is turned on again and a charge period is determined based on the light received by the line sensor 113 through the film (step S109).

Then, it is determined whether a pre-scan is to be performed (step S110). When performing a pre-scan, the excitation switcher 135 of the motor drive circuit 130 selects the 2—2 phase excitation circuit 135. Due to this, corresponding pulse signals are supplied to the scan motor 107 from the drive voltage supplier 136, based on the drive voltage and phase set in the 2—2 phase excitation circuit 131. As a result, the scan motor 107 is driven in full-steps and the transport table 101 and the film holder 201 are moved in the basic full-pitch units. Further, due to this movement, a coarse scan, that is, a pre-scan, is performed by the line sensor 113 (step S111). Here, in the embodiment, the line sensor 113 scans the RGB colors, so the RGB colors are scanned by a single scan. When the pre-scan is completed, the scan motor 107 is driven in reverse in full-steps by the same 2—2 phase excitation circuit 131 (step S112) to return the transport table 101 to the initial position (step S113). Note that when not performing the pre-scan, it is determined at step S114 whether the scan is to be ended. When it is to be ended, the program ends.

Figure 8:
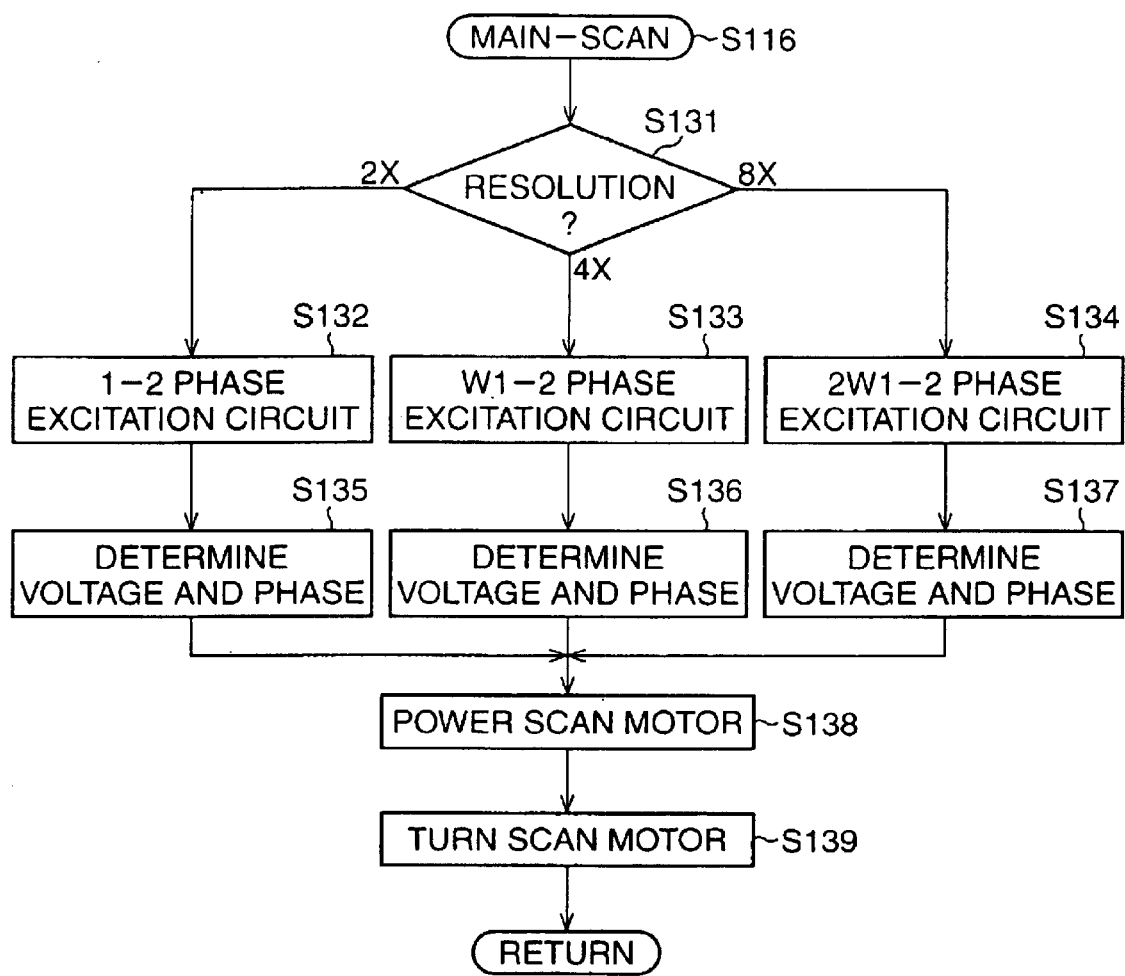
FIG. 8 is a flow chart of a program for carrying out a main scan.

When the pre-scan ends, it is determined whether a main-scan is to be performed (step S115). When not performing the main-scan, it is determined at step S114 whether the scan is to be ended. If it is to be ended, the program ends. When performing the main-scan, the main-scan corresponding to the selected resolution is performed (step S116). At step S116 of the main-scan, as shown in the flow chart of FIG. 8, the motor drive circuit 130 judges that the selected resolution is one of 2×, 4×, or 8× (step S131), then selects the 1-2 phase excitation circuit 132 in the case of 2× (step S132), selects the W1-2 phase excitation circuit 133 in the case of 4× (step S133), and selects the 2W1-2 phase excitation circuit 134 in the case of 8× (step S134). After such a selection, the drive voltage supplier 136 reads the drive voltage and phase set in the selected phase excitation circuit and sets these internally (steps S135, S136, and S137) and then supplies pulse signals based on the internal settings to the first phase terminal φ1 to the fourth phase terminal φ4 of the scan motor 107 (step S138). Due to this, the scan motor 107 is driven in half steps in the case of a 2× resolution, in quarter steps in the case of 4× resolution, and in eighth steps in the case of 8× resolution (step S139). Therefore, the transport table 101 is moved by a pitch of ½, ¼, and ⅛ compared with the above pre-scan corresponding to the selected resolutions, whereby a fine scan is performed at a resolution of two, four, and eight times that of the pre-scan. Note that in the main-scan, similar to the pre-scan, the RGB colors are simultaneously scanned by the line sensor 113.

Figure 7:
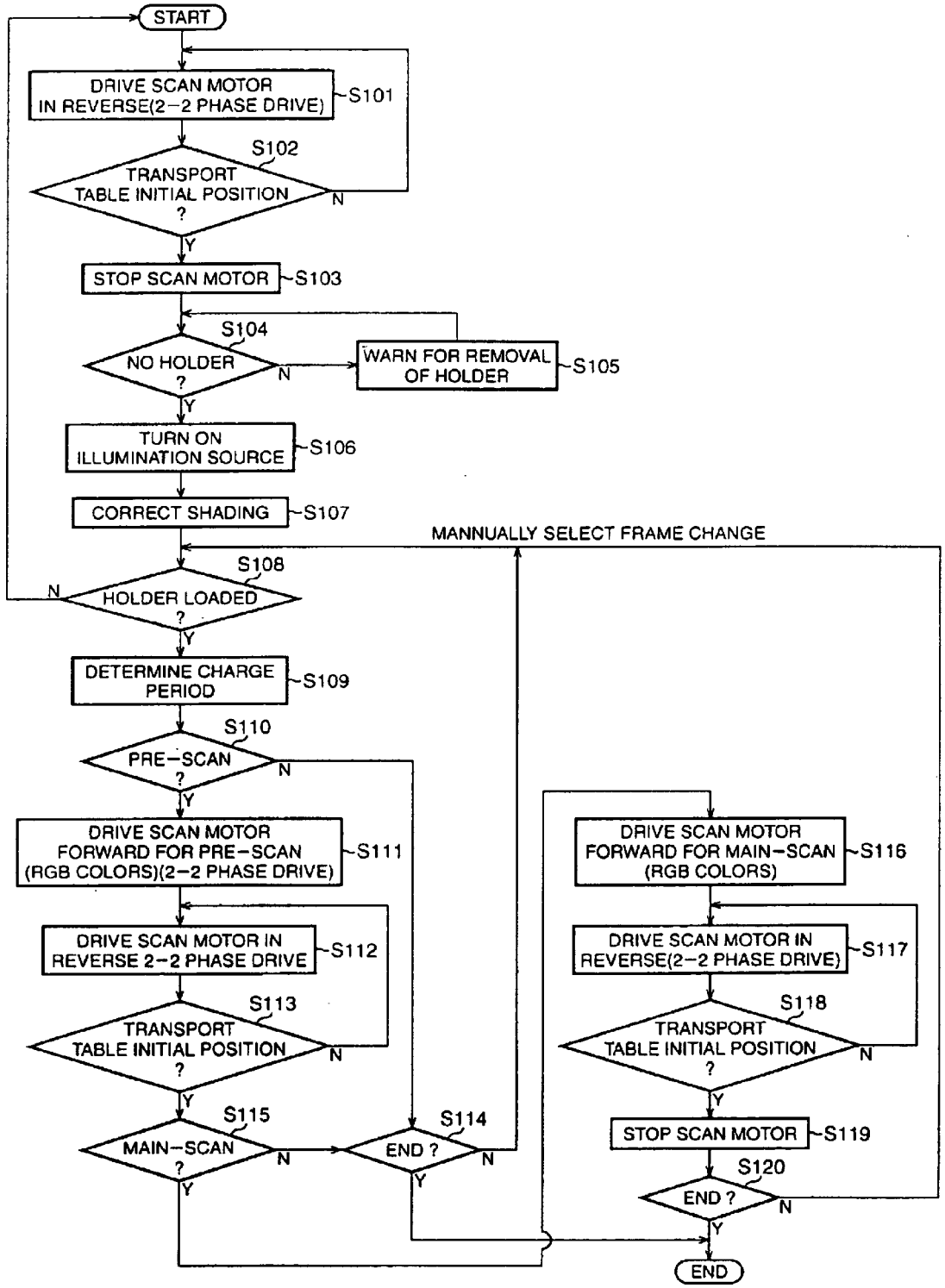
FIG. 7 is a flow chart of a program for carrying out a film scan operation.

When the scan by the main-scan is completed, in the program of FIG. 7, the scan motor 107 is driven in reverse to return the transport table 101 to the initial position (steps S117, S118), then the scan motor 107 is stopped (step S119). During this reverse drive of the scan motor 107, the drive circuit 130 can return the transport table 101 to the initial position at high speed by selecting the 2—2 phase excitation circuit 131. Then, it is determined whether the scan is to be ended or not (step S120) and the program ends. Note that when the scan at steps S114 and S120 is not ended, the routine returns to step S108. Conversely, when scanning another image of the film, the other image is positioned at the scanning gate of the transport table and the same process as above is performed. On the other hand, when the scanning is complete, while a detailed explanation will be omitted, the scan routine is ended by removing the film holder 201 from the transport table 101.

As described above, in the case of a main-scan where a high resolution is required, the scan motor 107 is driven by half steps of the basic full-step or is driven in microsteps, i.e. quarter steps and eighth steps, to make the transport table 101 move in steps of a small pitch for a sub-scan of the film, whereby a fine reading operation is realized. Conversely, in the case of a pre-scan etc. where a high resolution is not required, the scan motor 107 is driven in the basic full-steps to move the transport table 101 with a large pitch during sub-scan of the film, whereby a coarse reading operation is realized. Therefore, it is possible to realize scanning of film at different resolutions by a single motor and a single transport table scanning mechanism and thereby possible to simplify the structure of the scanning mechanism and reduce the size and cost of the film scanner.

In the embodiment, as examples of high resolutions for a main-scan, the examples of 2×, 4×, and 8× resolutions were shown, but in micro-stepping in a scan motor, that is, stepper motor, as explained above, by changing the ratio of the drive voltages supplied to the pair of phase coils, it is possible to set the steps to any value, therefore the step is not limited to the above quarter or eighth. For example, it is possible to set any step such as a third, fifth, or an even finer sixteenth etc. or set the steps to close to continuous extremely fine step intervals and realize a main-scan at any resolution corresponding to these set steps. In micro-stepping of the stepper motor, however, the precision of the rotation stop position of the rotor is determined by the relationship between the motor torque and the load torque of the drive system, so for example it is preferable to measure the precision of the rotation stop position while changing the voltage supplied to the stepper motor and the phase in various ways and to use the results of measurement to set a drive voltage (current) giving stable rotation step positions.

Note that, in the embodiment, the line sensor used was an RCB three-color three-line type, but it is also possible to use a 1-line type and treat the received signal as RGB color signals at an image processing circuit.

As described above, according to the embodiment, it is possible to drive the stepper motor at any different pitch angle. Thus, it is possible to move the transport table in steps at different pitches and scan at different resolutions without the provision of a speed changer, to simplify the configuration of the film scanner, to scan at a stable sub-scan speed, and to realize a high quality scan. Further, when scanning at a high resolution, by micro-stepping control of the stepper motor, it is possible to easily realize a scan at any high resolution.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Applications No. 2000-026341 (filed on Feb. 3, 2000) which is expressly incorporated herein, by reference, in its entirety.

What is claimed is:

1. A film scanner for reading an image formed on a film, said film scanner comprising:
   an imaging device that senses a part of the image;
   a transport table that supports the film;
   a single stepper motor that moves at least one of said imaging device and said transport table in a predetermined direction, so that said imaging device can sense an entire image; and
   a motor drive circuit that pulse-drives said single stepper motor in steps, said motor drive circuit enabling micro-stepping control of the stepper motor, said motor drive circuit drives said single stepper motor in increments of a first step when said image is read in a pre-scan, and drives said single stepper motor in increments of second steps, smaller than said first step, by said micro-stepping control when said image is read in a main-scan.

2. A film scanner according to claim 1, wherein said second steps in said main-scan is set to 1/n of said first step where n is natural number of 2 or more.

3. A film scanner according to claim 2, wherein said motor drive circuit is configured to enable switching to drive in a 2-2 phase excitation mode in whole first steps, to drive in a 1-2 phase excitation mode in half first steps, to drive in a W1-2 phase excitation mode in quarter first steps, and to drive in 2W1-2 phase excitation mode in one eighth first steps.

4. A film scanner according to claim 3, wherein said motor drive circuit drives said stepper motor in said 2-2 phase excitation mode in said pre-scan, selects one of said 1-2 phase excitation mode, said W1-2 phase excitation mode, and said 2W1-2 phase excitation mode to drive said stepper motor in said main-scan.

5. The film scanner according to claim 4, wherein said motor drive circuit selects one of said excitation modes in accordance with a resolution of said main scanning operation.

6. A film scanner according to claim 1, wherein said transport table is provided with a detachable film holder for holding the film, a position of said film holder with respect to said transport table being moveable to change said image to be read.

7. A film scanner according to claim 1, further comprising a rack provided at said transport table along said predetermined direction, and a pinion attached to an output shall of said stepper motor and configured to engage with said rack.

8. The film scanner according to claim 1, said motor drive circuit being configured to drive said single stepper motor at one of a plurality of different speeds during the main scan. attached to an output shall of said stepper motor and configured to engage with said rack.

9. A film scanner provided with an imaging device for performing a main-scan of a film on which an image is formed to scan the image and a scanning mechanism for moving the film in a sub-scan direction perpendicular to the main-scan direction with respect to said imaging device, said scanning mechanism comprising a transport table for supporting the film and transporting the film in the sub-scan direction and a transport mechanism that moves said transport table in the sub-scan direction, said transport mechanism comprising a single stepper motor as a source of drive power and a motor drive circuit for pulse driving said single stepper motor in steps, and said motor drive circuit being configured to enable micro-stepping control of the single stepper motor, said motor drive circuit driving said single stepper motor in increments of a first step when a pre-scan operation is performed, and driving said single stepper motor in increments of second steps, smaller than said first step, by said micro-stepping control when a main-scan operation is performed.

10. The film scanner according to claim 9, said motor drive circuit being configured to drive said single stepper motor in different excitation modes during the main scan operation in accordance with a resolution of said main scanning operation.

11. The film scanner according to claim 9, said motor drive circuit being configured to drive said single stepper motor at one of a plurality of different speeds during the main scan.

12. A film scanner for reading an image formed on a film, said film scanner comprising:

an imaging device;

a transport table;

a single stepper motor that moves at least one of said imaging device and said transport table in a predetermined direction; and a motor drive circuit that drives said single stepper motor, said motor drive circuit drives said single stepper motor in increments of a first step when a pre-scan operation is performed, and drives said single stepper motor in increments of second steps, smaller than said first step, when a main-scan operation is performed.

13. The film scanner according to claim 12, said motor drive circuit being configured to drive said single stepper motor at one of a plurality of different speeds during the main scan.

14. The film scanner according to claim 12, said motor drive circuit being configured to drive said single stepper motor in one of a plurality of excitation modes depending on a resolution in a main scanning operation.

\* \* \* \* \*